US010346341B2

(12) United States Patent
Castell et al.

(10) Patent No.: US 10,346,341 B2
(45) Date of Patent: Jul. 9, 2019

(54) DETECTING ORIENTATION OF A DEVICE DOCKED TO A DOCKING STATION

(71) Applicant: HEWLETT-PACKARD DEVELOPMENT COMPANY, L.P., Houston, TX (US)

(72) Inventors: Robin T Castell, Houston, TX (US); Richard E Hodges, Houston, TX (US); Scott P Saunders, Houston, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 15/519,739

(22) PCT Filed: Jan. 23, 2015

(86) PCT No.: PCT/US2015/012786
§ 371 (c)(1),
(2) Date: Apr. 17, 2017

(87) PCT Pub. No.: WO2016/118174
PCT Pub. Date: Jul. 28, 2016

(65) Prior Publication Data
US 2018/0300274 A1    Oct. 18, 2018

(51) Int. Cl.
G06F 13/00    (2006.01)
G06F 13/40    (2006.01)
G06F 1/16    (2006.01)

(52) U.S. Cl.
CPC .......... G06F 13/409 (2013.01); G06F 1/1632 (2013.01)

(58) Field of Classification Search
CPC .... G06F 1/1632; G06F 1/1613; G06F 1/1616; G06F 1/1669
See application file for complete search history.

(56) References Cited

U.S. PATENT DOCUMENTS

| 7,352,567 | B2* | 4/2008 | Hotelling | G06F 1/1632 312/223.2 |
| 8,504,823 | B2 | 8/2013 | Carpenter et al. | |
| 8,600,084 | B1 | 12/2013 | Garrett | |
| 8,619,416 | B2 | 12/2013 | Lim | |
| 8,805,399 | B2 | 8/2014 | Shmunis | |
| 2008/0278899 | A1 | 11/2008 | Hotelling et al. | |
| 2012/0246374 | A1 | 9/2012 | Fino | |
| 2013/0002206 | A1 | 1/2013 | Crumlin et al. | |
| 2014/0181345 | A1 | 6/2014 | Huang et al. | |

(Continued)

FOREIGN PATENT DOCUMENTS

JP    2009-217774 A    9/2009
KR    10-1326071 B1    11/2013

OTHER PUBLICATIONS

LeClair, D.; ""World's fastest" docking station charges six devices at once"; Jan. 23, 2014; 6 pages.

Primary Examiner — Idriss N Alrobaye
Assistant Examiner — Richard B Franklin
(74) Attorney, Agent, or Firm — HPI Patent Department

(57) ABSTRACT

Examples disclosed herein provide for the detection of an orientation of a device docked to a docking station for the device. Based on the orientation, the device may route logic on the device so that connection points on the device to make contact with connection points on the docking station are properly mapped to input/output ports on the docking station.

20 Claims, 7 Drawing Sheets

(56) References Cited

U.S. PATENT DOCUMENTS

2015/0205740 A1* 7/2015 Bassett ................ G06F 13/385
                                                    710/104
2016/0246332 A1* 8/2016 Deng .................... G06F 1/1632

* cited by examiner

DETECTING ORIENTATION OF A DEVICE DOCKED TO A DOCKING STATION

BACKGROUND

Consumers appreciate ease of use and reliability in their devices. They also appreciate aesthetically pleasing designs. Businesses may, therefore, endeavor to create and provide devices directed toward one or more of these objectives.

DETAILED DESCRIPTION

Figure 1A:
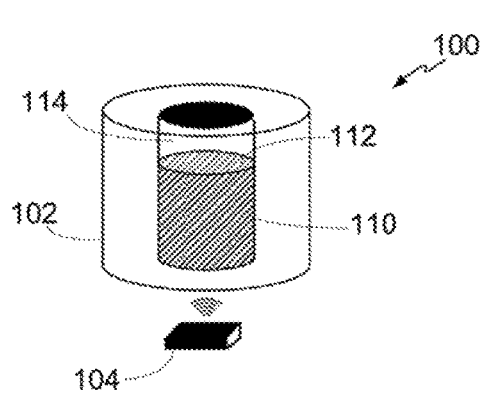
FIGS. 1A-B illustrate example interconnect assemblies that may be incorporated into a device for allowing the device to wirelessly communicate with another device having a corresponding interconnect assembly.

Docking stations may be used to connect a device to peripherals. For example, a notebook computer may be docked to a docking station in order to connect to common peripherals, such as a monitor, keyboard, and mouse. Although the common peripherals may be connected to the notebook computer separately, it may be preferable, instead, to make a single connection by docking the notebook computer to the docking station.

In addition to using a docking station to connect a device to peripherals, docking stations may be used to expand the capabilities of a device. For example, as the computing power of portable computing devices such as tablet computers continue to increase, users may desire to expand the use of such devices, for example, from solely employing the touchscreen on the display surface of the tablet computer for both viewing and input. As an example, the tablet computer may be docked to a docking station, which may include various ports (e.g., USB, HDMI, etc.) for expanding the use of the tablet computer. Examples include viewing content from the tablet computer on a secondary monitor connected to a video port of the docking station (e.g., HDMI), and connecting the tablet computer to various peripherals via the ports of the docking station (e.g., keyboard, mouse, etc.). The docking station may provide these expanded uses to the tablet computer, as the tablet computer by itself may not have the ports to connect to these peripherals separately.

Docking a device to a docking station may include the use of an interconnect assembly. Interconnect assemblies may include various mechanical components or elements, such as prongs, plugs, pins, or clips, which matingly engage a corresponding socket, aperture, opening or receptacle during connection. Examples of such interconnect assemblies include docking connection schemes between devices, and various cable assemblies (e.g., Universal Serial Bus, Video Graphics Array, High Definition Multimedia Interface, IEEE 1394, etc.) for use with devices, such as computers, tablets, mobile phones, televisions, and personal digital assistants. With regards to docking connection schemes, for example, between a notebook computer and a docking station, the notebook computer may need to be properly aligned with the docking station in order to mechanically engage the interconnect assembly between the devices.

The mechanical parts of these interconnect assemblies can be subject to damage and/or fatigue, which can compromise the integrity of a connection. Additionally, dirt, debris, moisture, and other contaminants may collect on or enter such interconnect assemblies and their corresponding sockets, apertures, openings or receptacles which can render them, and/or any devices to which they are connected, inoperable. Furthermore, such interconnect assemblies and their corresponding sockets, apertures, openings and receptacles may detract from the aesthetics of a device for at least some consumers.

Examples disclosed herein provide interconnect assemblies that allow devices to wirelessly communicate with each other. As an example, devices may include wireless communication units within their respective housings, which allow the devices to establish wireless communication links and communicate with each other once they are brought within proximity of each other. The interconnect assemblies may include magnetic members for aligning devices with each other and facilitating the wireless communication links between the devices. Devices utilizing interconnect assemblies that allow wireless communication with other devices may allow manufacturers to design such devices with no apertures or holes for connectors, contributing to the overall aesthetic appeal of the devices. As will be further described, a device may be docked to a docking station without regard to device orientation, allowing users to dock the device with minimal effort.

As used herein, the term "transceive" is defined as including both transmission and reception of data in the form of one or more signals. As used herein, the terms "wireless" and "wirelessly" are defined as including, but are not necessarily limited to, a connection or coupling that does not require mechanical components or elements such as prongs, plugs, pins, or clips that matingly engage a corresponding socket, aperture, opening or receptacle. Wireless connections and couplings may operate in any of a variety of different frequency ranges and wavelengths. They may also be established electrically, magnetically, or optically.

As used herein, the term "device" is defined as including, but is not necessarily limited to, a computer, tablet, mobile phone, television, personal digital assistant, monitor, display, audio component, peripheral, dock, sleeve, docking station, or appliance.

With reference to the figures, FIG. 1A illustrates an interconnect assembly 100 that may be incorporated into a device for allowing the device to wirelessly communicate with another device having a corresponding interconnect assembly according to an example. The interconnect assembly 100 generally includes a magnetic member 104 and a wireless communication unit 104. Although a cylindrical shape is illustrated, the magnetic member 104 can take any shape. As an example, the magnetic member 104 may include a hollow core to function as a waveguide for propagating signals from the wireless communication unit 104.

As mentioned above, the signals from the wireless communication unit 104 may operate in any of a variety of different frequency ranges and wavelengths. They may also be established electrically, magnetically, or optically. As an example, the wireless communication unit 104 may operate in the extremely high frequency (EHF) range. In other examples, the wireless communication unit 104 may operate substantially at sixty (60) gigahertz (GHz). In still other examples, the wireless communication unit 104 may operate substantially in an infrared frequency range. As will be further described, this use of such wireless technology for the wireless communication unit 104 helps to eliminate the issues, described above, associated with interconnect assemblies that utilize mechanical components.

For facilitating the transmission of signals from the wireless communication unit 104 via the hollow core of the magnetic member 102, the hollow core may include any suitable material for propagation of the signal. As an example, for the propagation of RF signals, the hollow core of the magnetic member 102 may include a plastic core 110 that may be coated with an electrically conductive material to form the waveguide. The plastic core 110 may be flush with the magnetic member 102 (not illustrated) or slightly recessed to provide a small air gap 114, depending on the application. As an example, an end 112 of the plastic core may also be curved to essentially form a lens to help control the shape of the energy beams from the signals as it leaves the connector assembly 100.

Figure 1B:
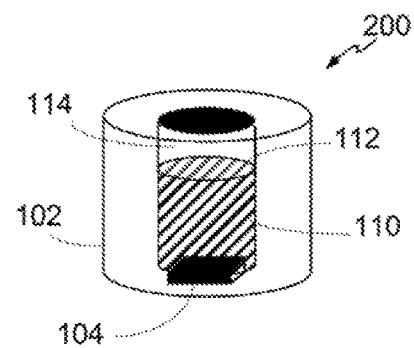

Referring to FIGS. 1A-B, the wireless communication unit 104 may be separate component from the magnetic member 102 (e.g., see FIG. 1A) or embedded into the magnetic member 102 to form a single assembly (e.g., see FIG. 1B). As illustrated in FIG. 1B, the wireless communication unit 104 may be embedded in the plastic core 110. Although the remaining figures illustrate wireless communication units as a separate component from magnetic members, wireless communication units may also be embedded within magnetic members.

As an example, the wireless communication unit 104 may be designed for short range proximity connectivity applications, as will be further described. When the wireless communication unit 104 is a separate component from the magnetic member 102, the wireless communication unit 104 may be coupled to the waveguide (e.g., plastic core 110) of the magnetic member 102 by a suitable waveguide (e.g., a plastic waveguide), in order to avoid any loss in transmissions from the wireless communication unit 104.

Figure 2A:
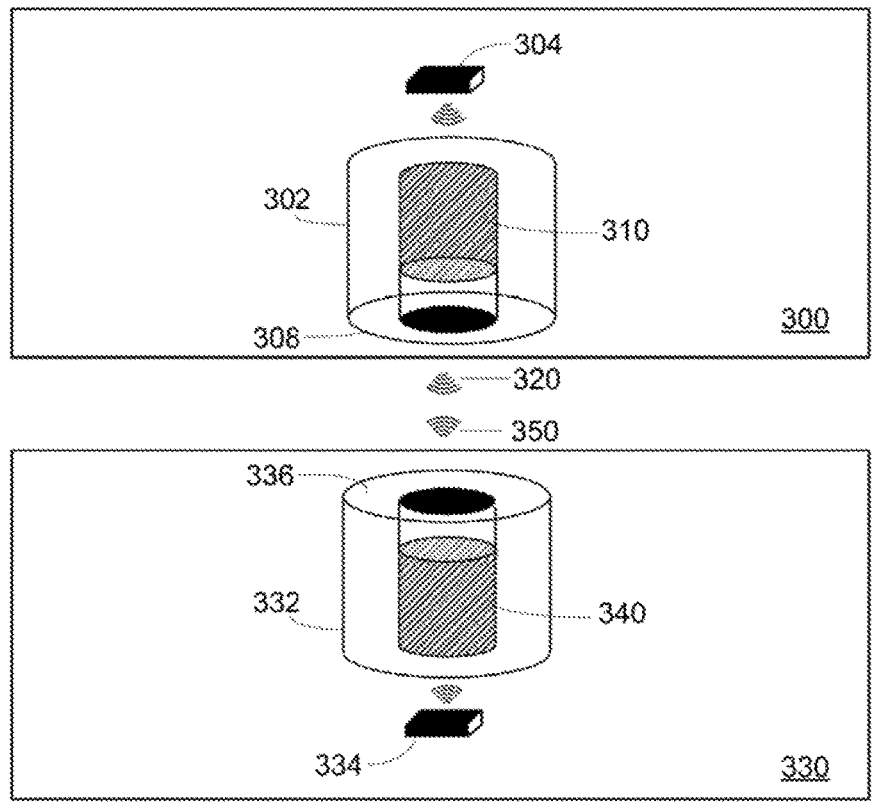
FIGS. 2A-B illustrate the examples for forming a wireless communication link between two devices.
Figure 2B:
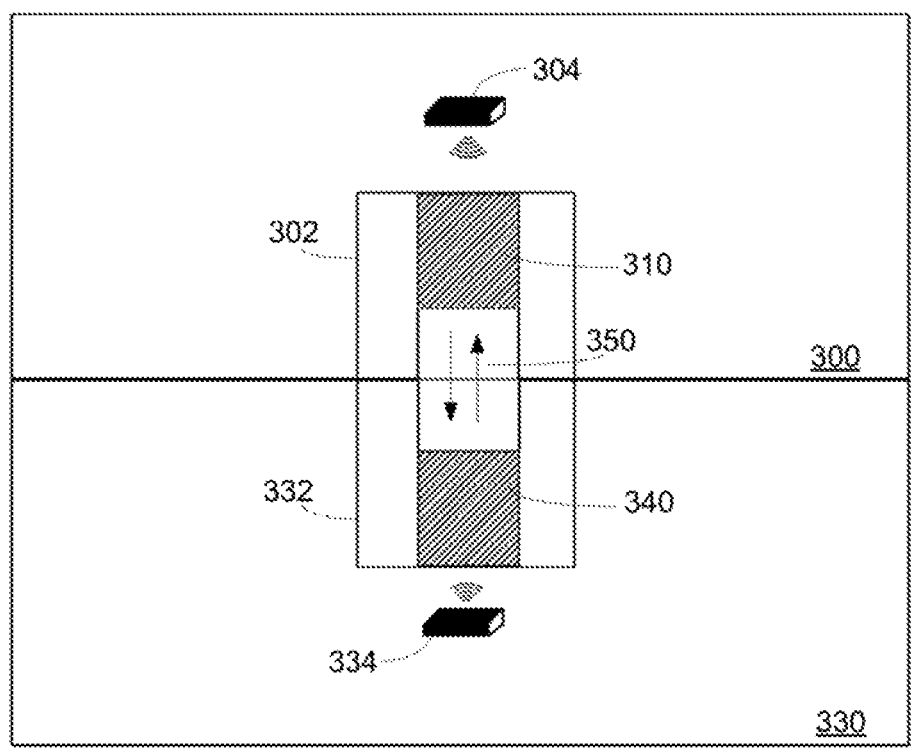

FIGS. 2A-B illustrate the process for forming a wireless communication link between two devices, according to an example. As will be further described, once the wireless communication link is established between the first and second device 300, 330, data connectivity may be achieved between the devices 300, 330. In addition, power connectivity may be achieved between the devices 300, 330, as will be further described. As an example, a situation where it may be desirable to have power and/or data connectivity between devices includes a tablet computer or notebook computer docking to a docking station. Other examples include various cable assemblies (e.g., Universal Serial Bus, Video Graphics Array, High Definition Multimedia Interface, IEEE 1394, etc.) for use with devices, such as computers, tablets, mobile phones, televisions, and personal digital assistants.

Referring to FIG. 2A, a first device 300 may be placed within proximity of a second device 330 in order to form the wireless communication link. For example, it may not be desirable to establish the wireless communication link when the devices 300, 330 are not in proximity to each other (e.g., more than several centimeters from each other), particularly to avoid signal loss or signal interference with other wireless communication units within the devices 300, 330 or surrounding devices. As illustrated, the first device 300 may include an interconnect assembly to wirelessly communicate with another interconnect assembly disposed within the second device 330. The interconnect assembly disposed within the first device 300 may include magnetic member 302 and wireless communication unit 304. Similarly, the interconnect assembly disposed within the second device 330 may include magnetic member 332 and wireless communication unit 334.

The features included in the interconnect assemblies of the first and second devices 300, 330 may correspond to the interconnect assemblies 100, 200 described above. For example, the magnetic members 302, 332 may include suitable material for propagation of signals from wireless communication units 304, 334, respectively. As an example, the hollow core of the magnetic members 302, 332 may include plastic cores 310, 340, respectively, that may be coated with electrically conductive material to form waveguides.

As illustrated, transmissions of signals from wireless communication unit 304 may propagate via plastic core 310 and pass through an enclosure wall of the device 300 (indicated by transmission 320). Similarly, transmissions of signals from wireless communication unit 334 may propagate via plastic core 340 and pass through an enclosure wall of the device 330 (indicated by transmission 350). In order for transmissions from wireless communication units 304, 334 to exit the enclosure walls, the materials and wall thickness may be chosen appropriately. In addition, it may not be necessary to mount the magnetic members 302, 332 flush against the enclosure walls in order to achieve wireless connectivity.

Referring to FIG. 2B, as the devices 300, 330 are placed within proximity of each other, magnetic members 302, 332 may cause devices 300, 330 to self-align with each other, and the magnetic members 302, 332 may then facilitate the wireless communication link between the devices 300, 330, for example, by aligning plastic cores 310, 340. The magnetic members 302, 332 may be arranged to produce magnetic fields that cooperate with each other to generate a magnetically attractive retention force that attaches the first device 300 and the second device 330 together in a mating engagement. Properties of the magnetic members 302, 332 that may be controlled include, but are not limited to, field strength and magnetic polarity. For example, an end 308 of magnet 302 may have a polarity (e.g., south pole) to magnetically attract an end 336 of magnet 332 (e.g., north pole). This magnetic coupling may allow for the devices 300, 330 to remain magnetically coupled to each other until a sufficient force is applied to overcome the magnetic coupling.

Once the devices 300, 330 are magnetically coupled to each other, as illustrated in FIG. 2B, wireless communication units 304, 334 may transceive data with each other (indicated by arrows 350), for example, via the wireless communication link formed by the magnetically coupled members 302, 332. Although the figures illustrates the devices 300, 330 transmitting and receiving only one way communication may be involved. For example, device 300 may transmit data and device 330 may receive data. As an example, the hollow cores of the magnetic members 302, 332 (or any suitable material for propagation, such as plastic cores 310, 340) may facilitate the exchange of data between the wireless communication units 304, 334. The wireless communication link provided by aligning the waveguides disposed within magnetic members 302, 332 may provide a self-shielding container to minimize any energy leakage. As a result, this may reduce any crosstalk interference and allow for a greater density of similar wireless communication links to be formed between devices 300, 330.

As an example, as the magnetic members 302, 332 provide a magnetically attractive retention force for aligning and magnetically attaching the devices 300, 330 to each other, in addition to achieving data connectivity, power connectivity may also be achieved, as will be further described. Referring to FIG. 2B, although magnetic members 302, 332 are disposed within devices 300, 330, end 308 of magnetic member 302 and end 336 of magnetic member 332 may be exposed through the enclosure walls (or slightly proud of the enclosure walls) of both devices 300, 330 (not illustrated). As an example, an outside surface of the magnetic members 302, 332, including ends 308, 336, may be mated with an electrically conductive material, in order to serve as a power connector. As a result, when magnetic member 302 is to magnetically couple with magnetic member 332, the electrically conductive material of both magnetic members 302, 332 may make contact with each other, achieving power connectivity. As an example, the power connectivity may allow for the first device 300 (e.g., a docking station) to transfer power from a connected power source (e.g., AC power) to the second device 330 (e.g., a tablet computer).

Figure 3:
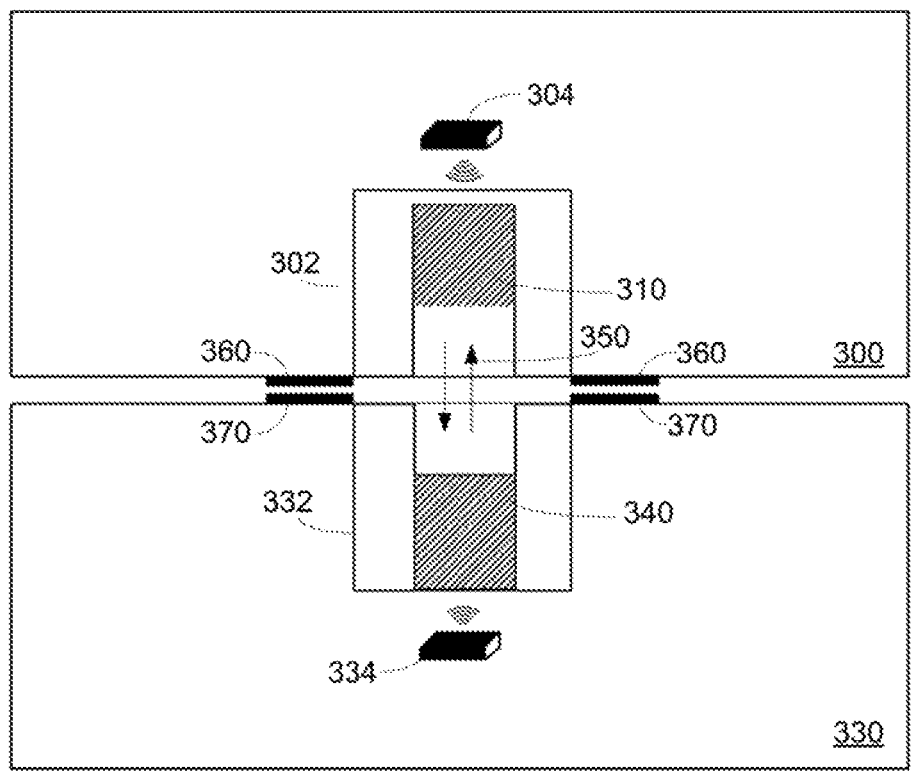
FIG. 3 illustrates the use of electrical contacts for achieving power connectivity between devices, according to an example.

Referring to FIG. 3, rather than using the magnetic members 302, 332 to achiever power connectivity, separate electrical contacts 360, 370 may be used instead for achieving power connectivity, according to an example. As illustrated, the magnetic member 302, 332 may be positioned or disposed within the devices 300, 330. As mentioned above, in order for transmissions from wireless communication units 304, 334 to exit the enclosure walls, the materials and wall thickness may be chosen appropriately. In addition, it may not be necessary to mount the magnetic members 302, 332 flush against the enclosure walls in order to achieve wireless connectivity. As an example, the electrical contacts 360, 370 may be located on or placed through the enclosure walls of devices 300, 330. Although device 300 illustrates a pair of electrical contacts 360 matching with a pair of electrical contacts 370 associated with device 330, the number of electrical contacts and arrangement may vary.

Although a single magnetic member 302 in first device 300 and a single magnetic member 332 in second device 330 are shown in the example of FIGS. 2B and 3, it is to be understood that a different number and/or arrangement of magnets may be used in other examples. For example, any number of magnets may be used in devices 300, 330 to provide a self-alignment as the devices 300, 330 are placed within proximity of each other, and the magnets may provide a retention force once the contact is made. As an example, although magnetic members 302, 332 may be included as waveguides to propagate signals from wireless communication units 304, 334 (e.g., to provide the wireless connection), additional magnets may be provided to provide the necessary alignment and retention forces. In addition, any number of magnetic members may be included as waveguides in the devices, in order to propagate a number of different signals between the devices, as will be further described.

FIGS. 4A-D provide example illustrations of a device 400 docking to a docking station 410 for the device 400 according to various orientations. The interconnect assemblies described above, with respect to FIGS. 1-3 make it possible for the device 400 to dock and communicate with the docking station 410 according to the various orientations illustrated, as will be further described. With the ability to dock the device 400 according to various orientations, users are not restricted to docking the device 400 according to a single orientation.

The device 400 may be, for example, a laptop computer, tablet computer, mobile computing device, or a cellular phone. The device 400 also includes a processor 418 and a storage device 422. The components of the device 400 may be connected and communicate through a system bus (e.g., PCI, ISA, PCI-Express, HyperTransport®, NuBus, etc.). The processor 418 can be a single core processor, a multi-core processor, a computing duster, or any number of other configurations. The processor 418 may be implemented as Complex Instruction Set Computer (CISC) or Reduced Instruction Set Computer (RISC) processors, x86 Instruction set compatible processors, multi-core, or any other microprocessor or central processing unit (CPU). As an example, the main processor 418 includes dual-core processor(s), dual-core mobile processor(s), or the like.

The device 400 may include a memory device 420. The memory device 420 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc., flash memory, or any other suitable memory systems. The storage device 422 may be a non-transitory computer-readable storage medium. The storage device 422 may have instructions stored thereon that, when executed by a processing resource, such as the processor 418, cause the wireless computing device 100 to perform operations.

In some examples, the instructions can be part of an installation package that, when installed, can be executed by processing resource(s) to implement the operations. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on a server including the processing resource. In such examples, the machine-readable storage medium may include memory such as a hard drive, solid state drive, or the like. In other examples, some or all of the functionalities described may be implemented in the form of electronic circuitry.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

Referring to FIG. 4A-D, the device 400 includes a first set 402A-E of connection points along a first side of the device 400, and a second set 404A-E of connection points along a second side of the device 400 that is perpendicular to the first side of the device 400. As will be further described, either the first set 402A-E of connection points or the second set 404A-E of connection points may make contact with a third set 406A-E of connection points on the docking station 410, allowing for the device 400 to dock and communicate with the docking station 410 according to a landscape or portrait orientation. Each connection point from the third set 406A-E of connection points on the docking station 410 may correspond to an input/output (I/O) port on the docking station 410 (not illustrated). Examples of I/O ports include, but are not limited to, USB and HDMI. Although five connection points are illustrated for each set, any number of connection points may be included in a set. As will be further described, based on the orientation of the device 400 with respect to the docking station 410, a port control and switching matrix 414 of the device 400 may route logic on the device 400 so that the connection points on the device 400 (e.g., either the first set 402A-E or the second set 404A-E) to make contact with the third set 406A-E of connection points are dynamically assigned to the I/O ports on the docking station 410.

As an example, connection points rot the first set 402A-E and the second set 404A-E on the device 400, and connection points from the third set 406A-E on the docking station 410 may include magnetic members (not illustrated), such that when the device 400 is to be docked with the docking station 410, the magnetic members of the connection points on the device 400 may magnetically couple with the magnetic members of the connection points on the docking station 410. In addition, signals may be exchanged by the device 400 and the docking station 410 over wireless communication links formed by the magnetically coupled magnetic members, as described above (e.g., see FIG. 2A). As an example, in order to achieve the magnetic coupling and wireless communication links between the device 400 and the docking station 410, each connection point from the first set 402A-E and the second set 404A-E on the device 400, and each connection point from the third set 406A-E on the docking station 410 may include an interconnect assembly 100 or interconnect assembly 200 as illustrated in FIG. 1A or 1B, respectively. As a result, referring to FIG. 4A as an example, when the device 400 is placed within proximity of docking station 410, magnetic members from the first set 402A-E of connection points on the device 400 and the third set 406A-E of connection points on the docking station 410 may cause the device 400 and docking station 410 to self-align with each other, and the magnetic members may then facilitate the wireless communication links between the device 400 and docking station 410.

As mentioned above, either the first set 402A-E of connection points or the second set 404A-E of connection points on the device 400 may make contact with the third set 406A-E of connection points on the docking station 410, allowing for the device 400 to dock and communicate with the docking station 410 according to a landscape or portrait orientation. As an example, the device 400 may include a sensor 416, such as a gyroscope, for detecting an orientation of the device 400 with respect to the docking station 410. In addition to determining whether the device 400 is in a portrait or landscape position with respect to the docking station 410, the sensor 416 may determine whether the device 400 is in a forward facing position or a reverse facing position with respect to the docking station 410. That way, a user may not be limited to docking the device 400 to the docking station 410 according to a single orientation.

Figure 4A:
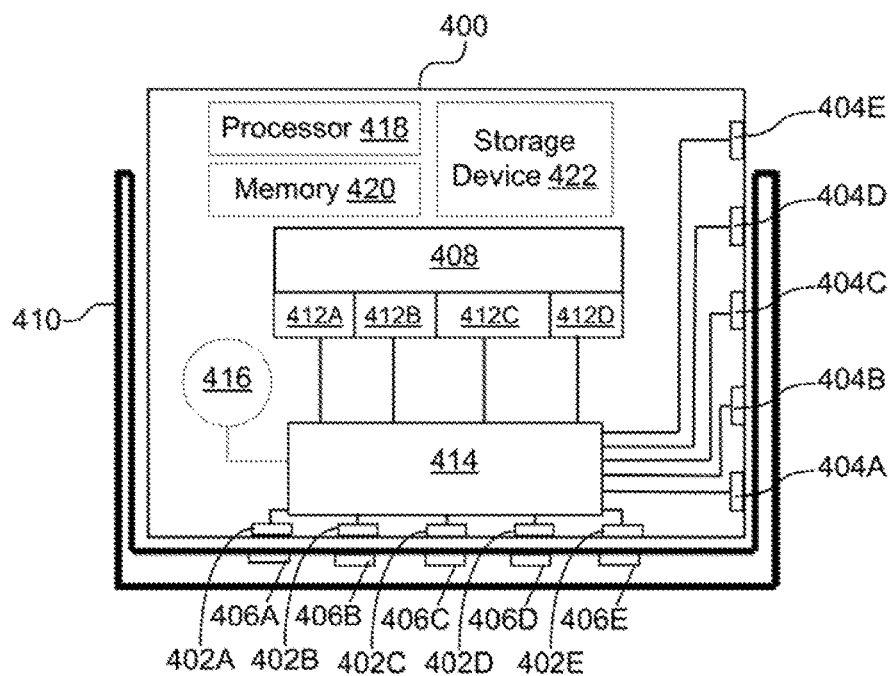
FIGS. 4A-D provide example illustrations of a device docking to a docking station for the device according to various orientations.
Figure 4B:
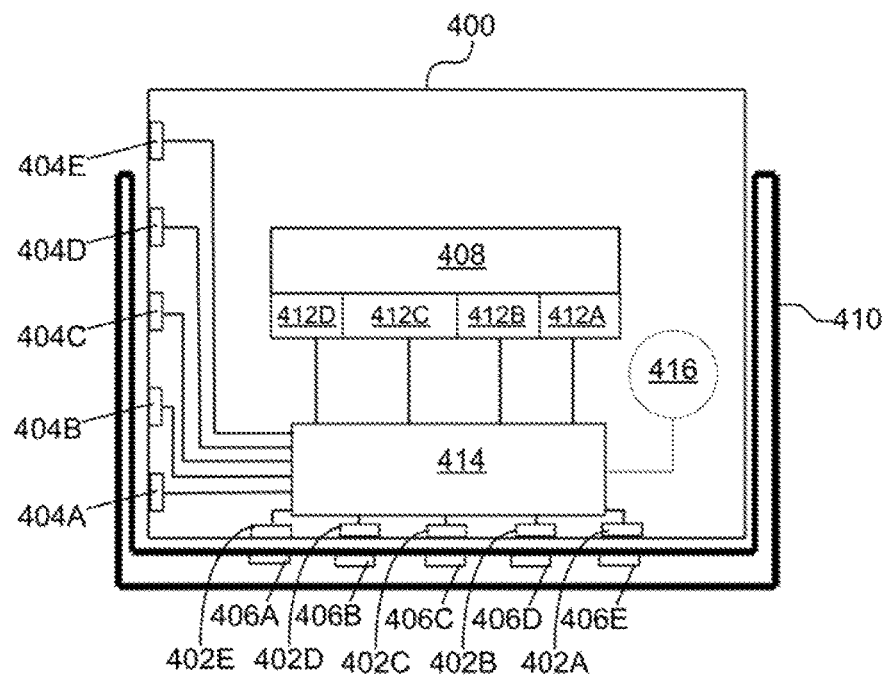
Figure 4D:
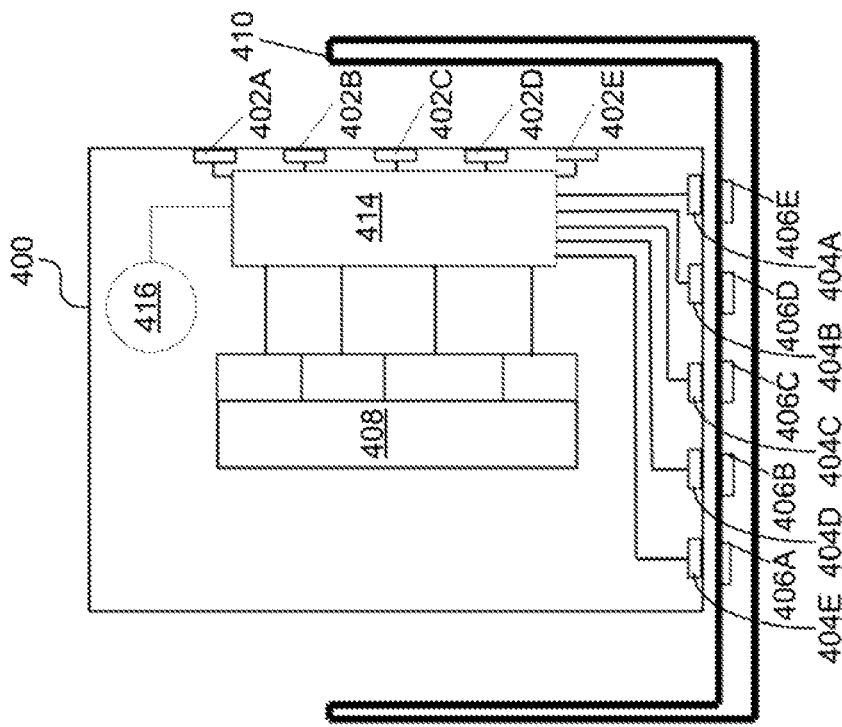
Figure 4C:
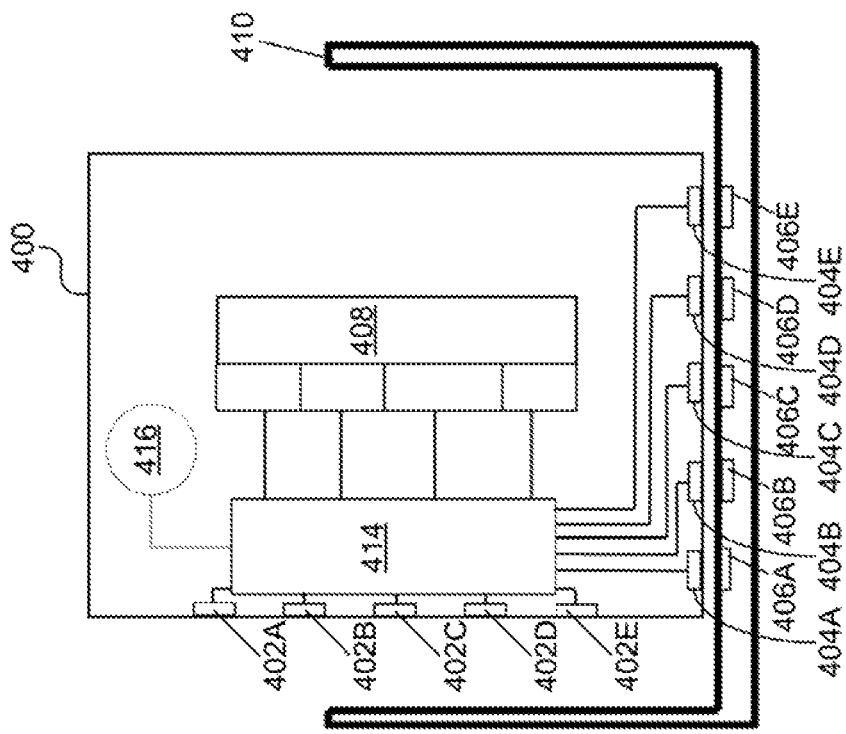

FIG. 4A illustrates the device 400 docked to the docking station 410 in a forward facing landscape position. FIG. 48 illustrates the device 400 docked to the docking station 410 in a reverse facing landscape position. FIG. 4C illustrates the device 400 docked to the docking station 410 in a forward facing portrait position. FIG. 4D illustrates the device 400 docked to the docking station 410 in a reverse facing portrait position. As will be further described, as the device 400 may be docked to the docking station 410 according to various orientations, the device 400 may include a routing unit to appropriately route logic on the device 400 so that connection points on the device 400 (e.g., either the first set 402A-E or the second set 404A-E) to make contact with the third set 406A-E of connection points on the docking station 410 are dynamically assigned and properly mapped to I/O ports on the docking station 410. As an example, in order to properly map connection points on the device 400 to I/O ports on the docking station 410, a discovery process may be utilized to discover protocols associated with each I/O port on the docking station 410.

Referring to FIGS. 4A-D, the routing unit may include a platform controller hub (PCH) 408 and a port control and switching matrix 414. The PCH 408 may assign I/O functions 412A-D based on the discovery process described above for detecting the I/O ports on the docking station 410. The I/O functions 412A-D available for assignment include, but are not limited to display protocols, such as HDMI, and communications protocols, such as USB. Although four functions are available for assignment via the PCH 408, any number of functions may be made available via the PCH 408. Once assignments have been made via the PCH 408, logic for the various functions may be routed via the port control and switching matrix 414 to the appropriate connection points on the device 400.

As illustrated, each connection point on the device 402 is individually connected to the switching matrix 414, which controls the mapping and selection of each connection point to an I/O port on the port hub. The switching matrix 414 may dynamically assign different types of I/O ports to a particular connection point on the device 400 to allow flexibility in I/O configuration based on the type of devices that are connected or the desired interconnect capability required by the application or use case. As an example, the switching matrix 414 may set the wireless communication units of the connection points on the device 400 to either transmit mode or receive mode, such that it aligns with the desired orientation of the device 400 with respect to the docking station 410.

Referring to FIG. 4A, the orientation sensor 416 detect that the device 400 is being docked to the docking station 410 in a forward facing landscape position. In this orientation, the first set 402A-E of connection points on the device 400 may make contact with the third set 406A-E of connection points on the docking station 410, as illustrated. As a result, the switching matrix 414 may route the logic of the I/O functions on the device 400 to the first set 402A-E of connection points instead of the second set 404A-E of connection points, in order to enable the I/O ports on the docking station 410. As each connection point from the third set 406A-E may correspond to an I/O port on the docking station 410, the device 400 may discover protocols associated with each I/O port, and the switching matrix 414 may dynamically assign the logic of the I/O functions to the appropriate connection points from the first set 402A-E. For example, if the connection point 406E on the docking station 410 corresponds to a display protocol, such as HDMI, the switching matrix 414 may dynamically assign the logic for the display protocol to connection point 402E on the device 400, which makes contact with connection point 406E on the docking station 410.

Referring to FIG. 48, the orientation sensor 416 may detect that the device 400 is being docked to the docking station 410 in a reverse facing landscape position (e.g., device is flipped over from FIG. 4A). In this orientation, the first set 402A-E of connection points on the device 400 also makes contact with the third set 406A-E of connection points on the docking station 410, as in FIG. 4A. However, the pairing between the first set 402A-E and the third set 406A-E is reversed, compared to FIG. 4A. Therefore, if the connection point 406E on the docking station 410 corresponds to a display protocol, as in the example described above, the switching matrix 414 may now dynamically assign the logic for the display protocol to connection point 402A instead, that makes contact with connection point 406E on the docking station 410. The switching matrix 414 makes it possible for logic to be appropriately routed and dynamically assigned without making any hardware modifications.

Referring to FIG. 4C, the orientation sensor 416 may detect that the device 400 is being docked to the docking station 410 in a forward facing portrait position. In this orientation, the second set 404A-E of connection points on the device 400 may make contact with the third set 406A-E of connection points on the docking station 410, as illustrated. As a result, the switching matrix 414 may route the logic of the I/O functions on the device 400 to the second set 404A-E of connection points instead of the first set 402A-E of connection points, in order to enable the I/O ports on the docking station 410. As each connection point from the third set 406A-E may correspond to an I/O port on the docking station 410, the switching matrix 414 may dynamically assign the logic of the I/O functions to the appropriate connection points from the second set 404A-E (e.g., via the discovery process). For example, if the connection point 406E on the docking station 410 corresponds to a display protocol, such as HDMI, the switching matrix 414 may dynamically assign the logic for the display protocol to connection point 404E on the device 400, which makes contact with connection point 406E on the docking station 410.

Referring to FIG. 4D, the orientation sensor 416 may detect that the device 400 is being docked to the docking station 410 in a reverse facing portrait position (e.g., device is flipped over from FIG. 4C). In this orientation, the second set 404A-E of connection points on the device 400 also makes contact with the third set 406A-E of connection points on the docking station 410, as in FIG. 4G. However, the pairing between the second set 404A-E and the third set 406A-E is reversed, compared to FIG. 4C. Therefore, if the connection point 406E on the docking station 410 corresponds to a display protocol, as in the example described above, the switching matrix 414 may now dynamically assign the logic for the display protocol to connection point 404A instead, that makes contact with connection point 406E on the docking station 410. The switching matrix 414 makes it possible for logic to be appropriately routed dynamically assigned without making any hardware modifications.

As an example, when docking the device 400 to the docking station 410, one of the connection points on the device 400 can be assigned to low speed signals and general-purpose input/output (GPIO) via aggregation logic contained within the port control and switching matrix 414 logic. This connection point may be used for miscellaneous control/status, GPIO, and slow speed serial buses. This connection point may also be used for port discovery and negotiation protocol for determining the type of connected peripheral and thereby how the ports should be configured. As an example, when the device 400 is docked to the docking station 410 in a landscape orientation, as illustrated in FIGS. 4A-B, connection point 402C may be assigned to low speed signals and GPIO. Similarly, when the device 400 is docked to the docking station 410 in a portrait orientation, as illustrated in FIGS. 4C-D, connection point 404C may be assigned to low speed signals and GPIO.

Figure 5:
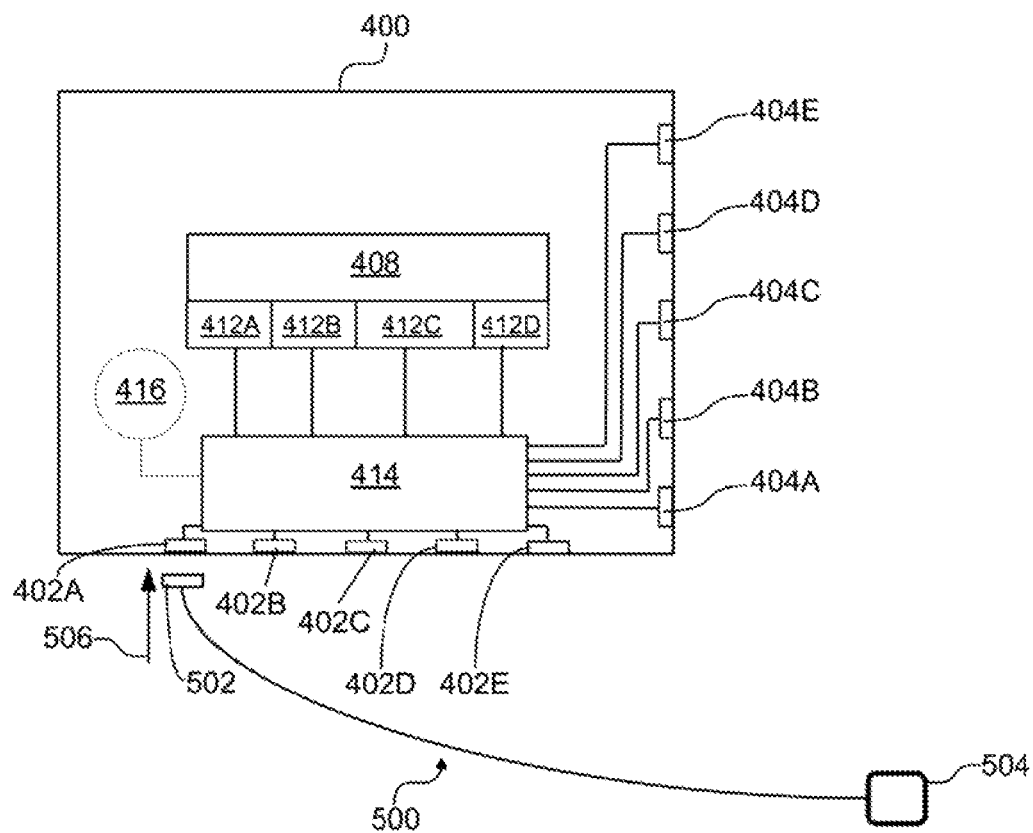
FIG. 5 illustrates a cable with a connection point for connecting peripherals to a connection point on the device, according to an example.

Referring to FIG. 5, rather than docking the device 400 to the docking station 410, cable 500 with a connection point 502 may be used for connecting peripherals to connection points on the device 400. Although the figure illustrates cable 500 making contact with connection point 402A on the device 400, the cable 500 may make contact with other connection points on the device (e.g., and connection point from the first set 402A-E or the second set 404A-E of connection points). As will be further described, a discovery process may be utilized for discovering the protocol associated with the cable 500, and logic may be routed on the device 400 so that the connection point on the device 400 to make contact with the connection point 502 of the cable 500 is to support input/output functions of the cable. The end of the cable 500 opposite to the connection point 502 may include a connector 504 for connecting to peripherals. Examples of connector 504 include, but are not limited to, USB and HMDI. Rather than including a connector 504, the cable 500 may be fixed to a peripheral (not illustrated), such as a keyboard or a mouse.

As an example, the connection point 502 of the cable 500 may include magnetic members (not illustrated), such that when the connection point 502 is brought within proximity of connection point 402A on device 400 (illustrated by arrow 506), the magnetic members of connection point 402A on the device 400 may magnetically couple with the magnetic members of connection point 502. In addition, signals may be exchanged between the device 400 and a peripheral connected via cable 500 over wireless communication links formed by the magnetically coupled magnetic members, as described above (e.g., see FIG. 2A). As an example, in order to achieve the magnetic coupling and wireless communication links between the device 400 and the docking station 410, connection point 502 may include an interconnect assembly 100 or interconnect assembly 200 as illustrated in FIG. 1A or 1B, respectively. As a result, when the connection point 502 of cable 500 is placed within proximity of a connection point on the device 400 (e.g., connection point 402A), magnetic members from connection points 402A and 502 may cause the connection point 502 to self-align with connection point 402A, and the magnetic members may then facilitate the wireless communication links between a peripheral connected to the cable 500 and the device 400.

As the cable 500 may be connected to any available connection point on the device 400, a discovery process may be utilized to discover the protocol associated with the connection made via cable 500. Upon discovering the protocol associated with the connection, the routing unit of the device 400 may route logic on the device 400 so that the connection point on the device 400 to make contact with the connection point 502 of the cable 500 is to support input/output functions of the cable. As an example, upon discovering the protocol associated with the connection, the PCH 408 may select the appropriate I/O function (e.g., from I/O functions 412A-D), and the switching matrix 414 may route the logic for the selected I/O function to the connection point on the device 400 to make contact with the connection point 502 of the cable 500.

Figure 6:
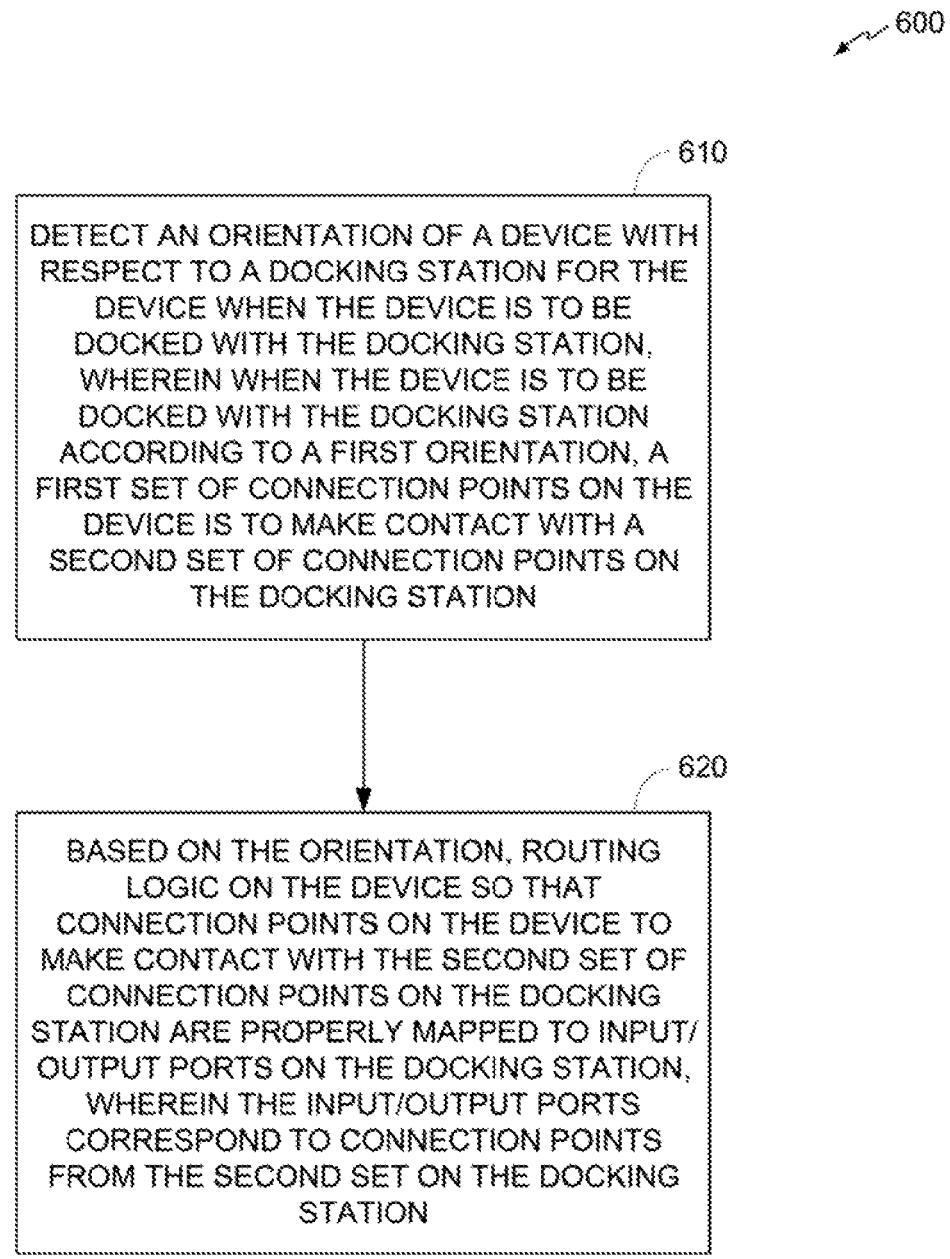
FIG. 6 is a flow diagram in accordance with an example of the present disclosure.

Referring to FIG. 6, a flow diagram is illustrated in accordance with various examples. The flow diagram illustrates, in a particular order, processes for detecting the orientation of a device with respect to a docking station for the device (e.g., device 400 and docking station 410). The order of the processes is not meant to limit the disclosure. Rather, it is expressly intended that one or more of the processes may occur in other orders or simultaneously. The disclosure is not to be limited to a particular example.

A method 600 may begin and progress to 610, where the device may detect an orientation of the device with respect to the docking station when the device is to be docked with the docking station. As an example, when the device is to be docked with the docking station according to a first orientation, a first set of connection points on the device is to make contact with a second set of connection points on the docking station. When the device is to be docked with the docking station according to a second orientation, a third set of connection points on the device may make contact with the second set of connection points on the docking station. In addition to detecting the orientation of the device with respect to the docking station, the device may detect whether it is in a forward facing or reverse facing position.

Progressing to 620, based on the orientation, the device may route logic on the device so that connection points on the device to make contact with the second set of connection points on the docking station are properly mapped to input/output ports on the docking station. As an example, the input/output ports correspond to connection points from the second set on the docking station.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method comprising:
    detecting an orientation of a device with respect to a docking station when the device is docked with the docking station, wherein when the device is to be docked with the docking station according to a first orientation, a first set of connection points on the device is to make contact with a second set of connection points on the docking station, the docking station comprising a plurality of input/output (I/O) ports into which respective peripheral devices are pluggable, wherein respective connection points of the second set of connection points correspond to respective different I/O ports of the plurality of I/O ports; and
    based on the detected orientation, routing, by a switch, logic functions on the device so that connection points on the device making contact with the second set of connection points on the docking station are properly mapped to the I/O ports on the docking station.

2. The method of claim 1, wherein when the device is to be docked with the docking station according to a second orientation, a third set of connection points on the device is to make contact with the second set of connection points on the docking station.

3. The method of claim 1, wherein detecting the orientation comprises determining whether the device is in a forward facing position or a reverse facing position with respect to the docking station.

4. The method of claim 3, wherein detecting the orientation comprises determining whether the device is in a portrait position or a landscape position with respect to the docking station.

5. The method of claim 1, wherein the connection points on the device and the second set of connection points on the docking station each comprise magnetic members, and wherein when the device is docked with the docking station, the magnetic members of the connection points on the device are to magnetically couple with the magnetic members of the second set of connection points on the docking station.

6. The method of claim 5, comprising:
    exchanging, by the device, signals with the docking station over wireless communication links formed by the magnetically coupled magnetic members.

7. The method of claim 1, wherein responsive to the device being docked to the docking station in the first orientation, the switch maps a first connection point on the device to a first I/O port of the plurality of I/O ports, and wherein responsive to the device being docked to the docking station in a different second orientation, the switch maps a different second connection point on the device to the first I/O port.

8. The method of claim 7, wherein the plurality of I/O ports on the docking station corresponding to respective different logic functions of the logic functions of the device.

9. The method of claim 7, wherein the plurality of I/O ports on the docking station support respective different communication protocols.

10. The method of claim 7, wherein the plurality of I/O ports on the docking station comprise a video port and a Universal Serial Bus (USB) port.

11. A device comprising:
    a first set of connection points disposed along a first side of the device;
    a second set of connection points disposed along a second side of the device that is perpendicular to the first side of the device;
    a sensor to detect an orientation of the device with respect to a docking station when the device is docked with the docking station; and
    a switch to route logic functions on the device so that connection points on the device to make contact with a third set of connection points on the docking station are properly mapped to a plurality of input/output (I/O) ports on the docking station, wherein respective connection points of the third set of connection points correspond to respective different I/O ports of the plurality of I/O ports into which respective peripheral devices are pluggable.

12. The device of claim 11, wherein when the device is docked with the docking station according to a first orientation, the first set of connection points on the device is to make contact with the third set of connection points on the docking station.

13. The device of claim 12, wherein when the first set of connection points on the device is to make contact with the third set of connection points on the docking station, the switch is to route the logic functions on the device to the first set of connection points to enable the I/O ports on the docking station.

14. The device of claim 12, wherein when the device is docked with the docking station according to a second orientation, the second set of connection points on the device is to make contact with the third set of connection points on the docking station.

15. The device of claim 11, wherein when a cable with a connection point is to make contact with a connection point from the first or second set of connection points on the device, the switch is to:
- discover a protocol associated with the cable; and
- route the logic functions on the device so that the connection point on the device to make contact with the connection point of the cable is to support I/O functions of the cable.

16. The device of claim 11, wherein responsive to the sensor detecting the device being docked to the docking station in a first orientation, the switch is to map a first connection point on the device to a first I/O port of the plurality of I/O ports, and wherein responsive to the sensor detecting the device being docked to the docking station in a different second orientation, the switch is to map a different second connection point on the device to the first I/O port.

17. The device of claim 11, wherein the plurality of I/O ports on the docking station support respective different communication protocols.

18. A non-transitory computer-readable storage medium comprising programming instructions which, when executed by a processing resource, cause a device to:
- detect an orientation of the device with respect to a docking station for the device when the device is docked with the docking station, the docking station comprising a plurality of input/output (I/O) ports into which respective peripheral devices are pluggable, wherein respective connection points on the docking station correspond to respective different I/O ports of the plurality of I/O ports; and
- based on the detected orientation, cause a switch to route logic functions on the device so that connection points on the device to make contact with the connection points on the docking station are properly mapped to the I/O ports on the docking station.

19. The non-transitory computer-readable storage medium of claim 18, wherein responsive to the device being docked to the docking station in a first orientation, the program instructions are to cause the switch to map a first connection point on the device to a first I/O port of the plurality of I/O ports, and wherein responsive to the device being docked to the docking station in a different second orientation, the program instructions are to cause the switch to map a different second connection point on the device to the first I/O port.

20. The non-transitory computer-readable storage medium of claim 18, wherein the plurality of I/O ports on the docking station support respective different communication protocols.

* * * * *